US008768818B2

(12) United States Patent
Kraemer et al.

(10) Patent No.: US 8,768,818 B2
(45) Date of Patent: *Jul. 1, 2014

(54) IDENTIFYING TEASER SURFERS WITH TIME SERIES CREDIT HISTORY

(75) Inventors: James Richard Kraemer, Dallas, TX (US); Shiping Liu, Castro Valley, CA (US); Edgar Leroy Murphy, Jr., Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 1347 days.

This patent is subject to a terminal disclaimer.

(21) Appl. No.: 12/193,591

(22) Filed: Aug. 18, 2008

(65) Prior Publication Data
US 2009/0048965 A1 Feb. 19, 2009

Related U.S. Application Data

(63) Continuation of application No. 09/505,031, filed on Feb. 16, 2000, now Pat. No. 7,421,409.

(51) Int. Cl.
*G06Q 40/00* (2012.01)
(52) U.S. Cl.
USPC .............................. 705/37; 705/36 R; 705/38
(58) Field of Classification Search
USPC ...................................................... 705/35–40
See application file for complete search history.

(56) References Cited

U.S. PATENT DOCUMENTS

| | | | |
|---|---|---|---|
| 3,982,103 A | 9/1976 | Goldman | |
| 4,774,664 A | 9/1988 | Campbell et al. | |
| 5,103,392 A | 4/1992 | Mori | |
| 5,262,941 A | 11/1993 | Saladin et al. | |
| 5,569,897 A * | 10/1996 | Masuda | 235/379 |
| 5,611,052 A | 3/1997 | Dykstra et al. | |
| 5,774,882 A | 6/1998 | Keen et al. | |
| 5,774,883 A | 6/1998 | Andersen et al. | |
| 5,797,133 A | 8/1998 | Jones et al. | |
| 5,878,403 A | 3/1999 | Defrancesco et al. | |
| 5,970,478 A * | 10/1999 | Walker et al. | 705/35 |
| 6,021,397 A * | 2/2000 | Jones et al. | 705/36 R |
| 6,088,686 A * | 7/2000 | Walker et al. | 705/38 |
| 6,267,292 B1 * | 7/2001 | Walker et al. | 235/379 |
| 6,311,169 B2 * | 10/2001 | Duhon | 705/38 |
| 6,343,279 B1 * | 1/2002 | Bissonette et al. | 705/41 |

(Continued)

OTHER PUBLICATIONS

Credit-card companies have come a courtin': [1,2 Edition] Ann Perry. THe San Diego Union—Tribune. San Diego, Calif.: Jan. 30, 2000. p. I.1.*

(Continued)

*Primary Examiner* — Olabode Akintola
(74) *Attorney, Agent, or Firm* — Yee & Associates, P.C.; John R. Pivnichny (57) ABSTRACT

Initially the amount of data is checked to determine whether a sufficient history is present for the method. Credit card accounts are classified as new, relatively new, and old cards, i.e. opened within six months, within twelve months, and over twelve months ago. The balances for each of the three categories are calculated for each month. The average balance percentages of cards opened within six months and twelve months for the last twenty-four months is calculated and teaser surfers are defined as either having average percentages within the last twenty-four months for all credit cards opened within six and twelve months are greater than predefined percentages.

20 Claims, 10 Drawing Sheets (56) References Cited

U.S. PATENT DOCUMENTS

| | | | |
|---|---|---|---|
| 6,374,230 B1 * | 4/2002 | Walker et al. | 705/35 |
| 6,405,181 B2 * | 6/2002 | Lent et al. | 705/38 |
| 6,487,284 B1 * | 11/2002 | Campbell | 379/144.04 |
| 7,421,409 B1 | 9/2008 | Kraemer et al. | |
| 2001/0042785 A1 * | 11/2001 | Walker et al. | 235/379 |
| 2004/0117302 A1 * | 6/2004 | Weichert et al. | 705/40 |

OTHER PUBLICATIONS

Perry et al., "Credit-Card Companies Have Come a Courtin", [1,2 Edition], The San Diego Union—Tribune, San Diego, California, Jan. 30, 2000, p. 1.1.

Office Action regarding U.S. Appl. No. 09/505,031, dated Jan. 27, 2003, 31 pages.

Office Action regarding U.S. Appl. No. 09/505,031, dated Aug. 29, 2003, 4 pages.

Office Action regarding U.S. Appl. No. 09/505,031, dated Mar. 16, 2004, 3 pages.

Office Action regarding U.S. Appl. No. 09/505,031, dated Dec. 5, 2005, 19 pages.

Office Action regarding U.S. Appl. No. 09/505,031, dated May 3, 2006, 17 pages.

Final Office Action regarding U.S. Appl. No. 09/505,031, dated Nov. 2, 2006, 19 pages.

Office Action regarding U.S. Appl. No. 09/505,031, dated Aug. 23, 2007, 27 pages.

Notice of Allowance regarding U.S. Appl. No. 09/505,031, dated Mar. 5, 2008, 12 pages.

\* cited by examiner

| | Credit Card Debt | | | | | | | | | |
|---|---|---|---|---|---|---|---|---|---|---|
| Month | 802 | 804 | 806 | 808 | 810 | 812 | 814 | 816 | 818 | 820 | Total |
| 1 | 6500 | | | | | | | 2100 | | | 8600 |
| 2 | 7000 | | | | | | | 1500 | | | 8500 |
| 3 | 7500 | | | | | | | 1700 | | | 9200 |
| 4 | 7500 | | | | | | | 1900 | | | 9400 |
| 5 | 8000 | | | | | | | 2200 | | | 10200 |
| 6 | 6500 | | | | | | | 2100 | | | 8600 |
| 7 | 1500 | | | | | | | 2200 | | | 3700 |
| 8 | 1300 | 0 | | | | | | 2100 | | | 3400 |
| 9 | 600 | 7800 | | | | | | 1900 | | | 10300 |
| 10 | 100 | 6450 | | | | | | 1600 | | | 8150 |
| 11 | 100 | 6900 | | | | | | 1500 | 0 | | 8500 |
| 12 | 100 | 6750 | | | | | | 1700 | 1100 | | 9650 |
| 13 | 0 | 7350 | | | | | | 1600 | 1200 | | 10150 |
| 14 | 0 | 5400 | 0 | | | | | 1700 | 2140 | | 9240 |
| 15 | 0 | 0 | 9467.25 | | | | | 1800 | 1700 | | 12967.25 |
| 16 | 0 | 1110 | 11305.5 | | | | | 900 | 1900 | | 15215.5 |
| 17 | 0 | 330 | 11253.8 | | | | | 850 | 2200 | | 14633.75 |
| 18 | 0 | 0 | 10923.8 | | | | | 900 | 2100 | | 13923.75 |
| 19 | 0 | 90 | 11742 | | | | | 600 | 2200 | | 14632 |
| 20 | 0 | 90 | 9557.25 | 0 | | | | 1000 | 2100 | | 12747.25 |
| 21 | 0 | 0 | 2184.75 | 5720 | | | | 900 | 900 | | 9704.75 |
| 22 | 0 | 0 | 1893.45 | 6160 | | | | 800 | 800 | | 9653.45 |
| 23 | 0 | 0 | 873.9 | 6600 | | | | 900 | 900 | | 9273.9 |
| 24 | 0 | 0 | 145.65 | 6600 | | | | 200 | 200 | | 7145.65 |
| 25 | 0 | 0 | 145.65 | 7040 | | | | 300 | 300 | | 7785.65 |
| 26 | 0 | 0 | 145.65 | 5720 | | | | 500 | 1500 | | 7865.65 |
| 27 | 0 | 0 | 0 | 1590 | 0 | | | 900 | 1700 | | 4190 |
| 28 | 0 | 0 | 0 | 1378 | 6825 | | | 1100 | 1900 | | 11203 |
| 29 | 0 | 0 | 0 | 636 | 7350 | | | 600 | 2200 | 0 | 10786 |
| 30 | 0 | 0 | 0 | 106 | 7875 | | | 500 | 400 | 2100 | 10981 |
| 31 | 0 | 0 | 0 | 106 | 7875 | | | 750 | 350 | 2200 | 11281 |
| 32 | 0 | 0 | 0 | 106 | 8400 | | | 1100 | 500 | 2100 | 12206 |
| 33 | 0 | 0 | 0 | 0 | 6825 | 0 | | 850 | 0 | 1900 | 9575 |
| 34 | 0 | 0 | 0 | 0 | 2500 | 9100 | | 200 | 200 | 1600 | 13600 |
| 35 | 0 | 0 | 0 | 0 | 2745.14 | 7840 | | 300 | 250 | 1500 | 12635.138 |
| 36 | 0 | 0 | 0 | 0 | 2379.12 | 8400 | | 450 | 500 | 1700 | 13429.12 |
| 37 | 0 | 0 | 0 | 0 | 1098.06 | 8400 | | 400 | 450 | 2100 | 12448.055 |
| 38 | 0 | 0 | 0 | 0 | 183.009 | 8960 | | 350 | 400 | 1900 | 11793.009 |
| 39 | 0 | 0 | 0 | 0 | 183.009 | 7280 | 0 | 500 | 350 | 1600 | 9913.0092 |
| 40 | 0 | 0 | 0 | 0 | 0 | 1680 | 8775 | 0 | 200 | 1500 | 12155 |
| 41 | 0 | 0 | 0 | 0 | 0 | 1456 | 9450 | 200 | 350 | 1700 | 13156 |
| 42 | 0 | 0 | 0 | 0 | 0 | 4400 | 10125 | 250 | 400 | 1600 | 16775 |
| 43 | 0 | 0 | 0 | 0 | 0 | 112 | 10125 | 500 | 2100 | 2700 | 15537 |
| 44 | 0 | 0 | 0 | 0 | 0 | 112 | 10800 | 450 | 1900 | 1700 | 14962 |
| 45 | 0 | 0 | 0 | 0 | 0 | 112 | 11469.9 | 400 | 1600 | 1600 | 15181.938 |
| 46 | 0 | 0 | 0 | 0 | 0 | 0 | 1600 | 350 | 1500 | 1700 | 5150 |
| 47 | 0 | 0 | 0 | 0 | 0 | 0 | 1100 | 200 | 1700 | 1800 | 4800 |
| 48 | 0 | 0 | 0 | 0 | 0 | 0 | 200 | 350 | 1600 | 900 | 3050 |
| 49 | 0 | 0 | 0 | 0 | 0 | 0 | 0 | 400 | 2700 | 850 | 3950 |

| Month | 6 mo | 12 mo | % <6 mo Debt | % <12 mo Debt |
|---|---|---|---|---|
| 1 | 6500 | 6500 | 0.755813953 | 0.755813953 |
| 2 | 7000 | 7000 | 0.823529412 | 0.823529412 |
| 3 | 7500 | 7500 | 0.815217391 | 0.815217391 |
| 4 | 7500 | 7500 | 0.79787234 | 0.79787234 |
| 5 | 8000 | 8000 | 0.784313725 | 0.784313725 |
| 6 | 6500 | 6500 | 0.755813953 | 0.755813953 |
| 7 | 1500 | 1500 | 0.405405405 | 0.405405405 |
| 8 | 0 | 1300 | 0 | 0.382352941 |
| 9 | 7800 | 8400 | 0.757281553 | 0.815533981 |
| 10 | 6450 | 6550 | 0.791411043 | 0.803680982 |
| 11 | 6900 | 7000 | 0.811764706 | 0.823529412 |
| 12 | 7850 | 7950 | 0.813471503 | 0.823834197 |
| 13 | 8550 | 8550 | 0.842364532 | 0.842364532 |
| 14 | 7540 | 7540 | 0.816017316 | 0.816017316 |
| 15 | 11167.3 | 11167.25 | 0.861188764 | 0.861188764 |
| 16 | 13205.5 | 14315.5 | 0.867897867 | 0.940849791 |
| 17 | 13453.8 | 13783.75 | 0.919364483 | 0.941915094 |
| 18 | 10923.8 | 13023.75 | 0.784540803 | 0.935362241 |
| 19 | 11742 | 14032 | 0.802487698 | 0.958993986 |
| 20 | 9557.25 | 11747.25 | 0.749749946 | 0.921551707 |
| 21 | 5720 | 8804.75 | 0.589402097 | 0.907261908 |
| 22 | 6160 | 8853.45 | 0.638113835 | 0.917128073 |
| 23 | 6600 | 7473.9 | 0.7116747 | 0.8059069 |
| 24 | 6600 | 6745.65 | 0.923638857 | 0.944021887 |
| 25 | 7040 | 7185.65 | 0.90422765 | 0.922935144 |
| 26 | 5720 | 5865.65 | 0.727212627 | 0.745729851 |
| 27 | 0 | 1590 | 0 | 0.37947494 |
| 28 | 6825 | 8203 | 0.609211818 | 0.732214585 |
| 29 | 7350 | 7986 | 0.681438902 | 0.740404228 |
| 30 | 9975 | 10081 | 0.908387214 | 0.918040251 |
| 31 | 10075 | 10181 | 0.893094584 | 0.902490914 |
| 32 | 10500 | 10606 | 0.860232672 | 0.868916926 |
| 33 | 8725 | 8725 | 0.911227154 | 0.911227154 |
| 34 | 10700 | 13200 | 0.786764706 | 0.970588235 |
| 35 | 9340 | 12085.1384 | 0.739208367 | 0.956470599 |
| 36 | 8400 | 12479.1199 | 0.625506366 | 0.929258209 |
| 37 | 8400 | 11598.0554 | 0.674804197 | 0.931716242 |
| 38 | 8960 | 11043.0092 | 0.759772152 | 0.936403001 |
| 39 | 7280 | 9063.00923 | 0.734388502 | 0.91425409 |
| 40 | 8775 | 11955 | 0.721925134 | 0.983545866 |
| 41 | 9450 | 12606 | 0.718303436 | 0.95819398 |
| 42 | 10125 | 14525 | 0.603576751 | 0.865871833 |
| 43 | 10125 | 10237 | 0.651670207 | 0.658878805 |
| 44 | 10800 | 10912 | 0.721828633 | 0.729314263 |
| 45 | 11469.9 | 11581.9375 | 0.755498928 | 0.762876115 |
| 46 | 0 | 1600 | 0 | 0.310679612 |
| 47 | 0 | 1100 | 0 | 0.229166667 |
| 48 | 0 | 200 | 0 | 0.06557377 |
| 49 | 0 | 0 | 0 | 0 |

IDENTIFYING TEASER SURFERS WITH TIME SERIES CREDIT HISTORY

This application is a continuation of application Ser. No. 09/505,031, filed Feb. 16, 2000, status: issued Sep. 2, 2008 as U.S. Pat. No. 7,421,409.

BACKGROUND OF THE INVENTION

1. Technical Field

The present invention is related to consumer credit. More particularly the present invention is a system and method for identifying which potential customers are teaser surfers and point chruners for card issuers.

2. Description of Related Art

Strong competition in the credit card industry has driven banks and credit card issuers to compete for profitable customers. Many of the credit card issuers have used "teaser" rates as a vehicle to lure customers away from a competitor or attract new customers. Low teaser rates such as 3.9%, 2.9% even 0% for a given time period such as three, six, or twelve months for both charges and balance transfers have been widely used by credit card issuers. The hope is that those customers who transfer their balances from a rival credit card issuer or charge on their new cards will stay after teaser rates expire. In 1997, more than 60% of all Visa (a registered trademark of Visa PO Box 8999 San Francisco, Calif. 94128-8999) and MasterCard (a registered trademark of MasterCard International 2000 Purchase Street Purchase, NY 10577 U.S.A.) offers were with low interest teaser rates and 18% of households in U.S. transferred balances.

Other than using teaser rates, some credit card issuers entice potential customers by issuing rewards. Generally the rewards are in the form of points which accrue as the credit card is used or balances are transferred. Popular rewards are in the form of frequent flyer miles and free hotel points. These rewards may be combined with low interest rates for initial balance transfers and charges within teaser period.

As a result of this competition process, teaser surfers and point churners were born. Teaser surfers are those customers who transfer their balances from one card to another to take advantages of low introductory interest rates. Point churners are those customers who transfer their balance from card to card to accumulate points for frequent flyer miles, free hotel points, or other benefits. In turn, this lead to great losses for credit card issuers on teaser surfers and point churners because of free points and low interest rates (not enough to cover funding costs), acquisition costs, and operation costs. Being able to identify those teaser surfers and point churners could save a huge amount of losses for credit card issuers.

It would be advantageous to provide credit card issuers with the means to help credit card issuers to filter out those teaser surfers from credit card solicitation process, which in turn will reduce costs of card solicitation process and avoid potential losses.

SUMMARY OF THE INVENTION

The present invention can be used by credit card issuers to identify those who are teaser surfers or point churners by examining historical credit bureau data. Credit card accounts are classified as new, relatively new, and old cards, i.e. opened within six months, within twelve months, and over twelve months ago. The balances for each of three categories are calculated for each month. The average balance percentages of credit cards opened within six months and twelve months for the last twenty-four months are then calculated. Teaser surfers are then defined as either having average percentages within the last twenty-four months for all credit cards opened within six and twelve months are greater than predefined percentages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a table containing credit card data readily available from a credit bureau;

FIG. 7 is a table containing data computed using an algorithm in accordance with a preferred embodiment of the present invention;

DETAILED DESCRIPTION OF THE PREFERRED EMBODIMENT

Figure 1:
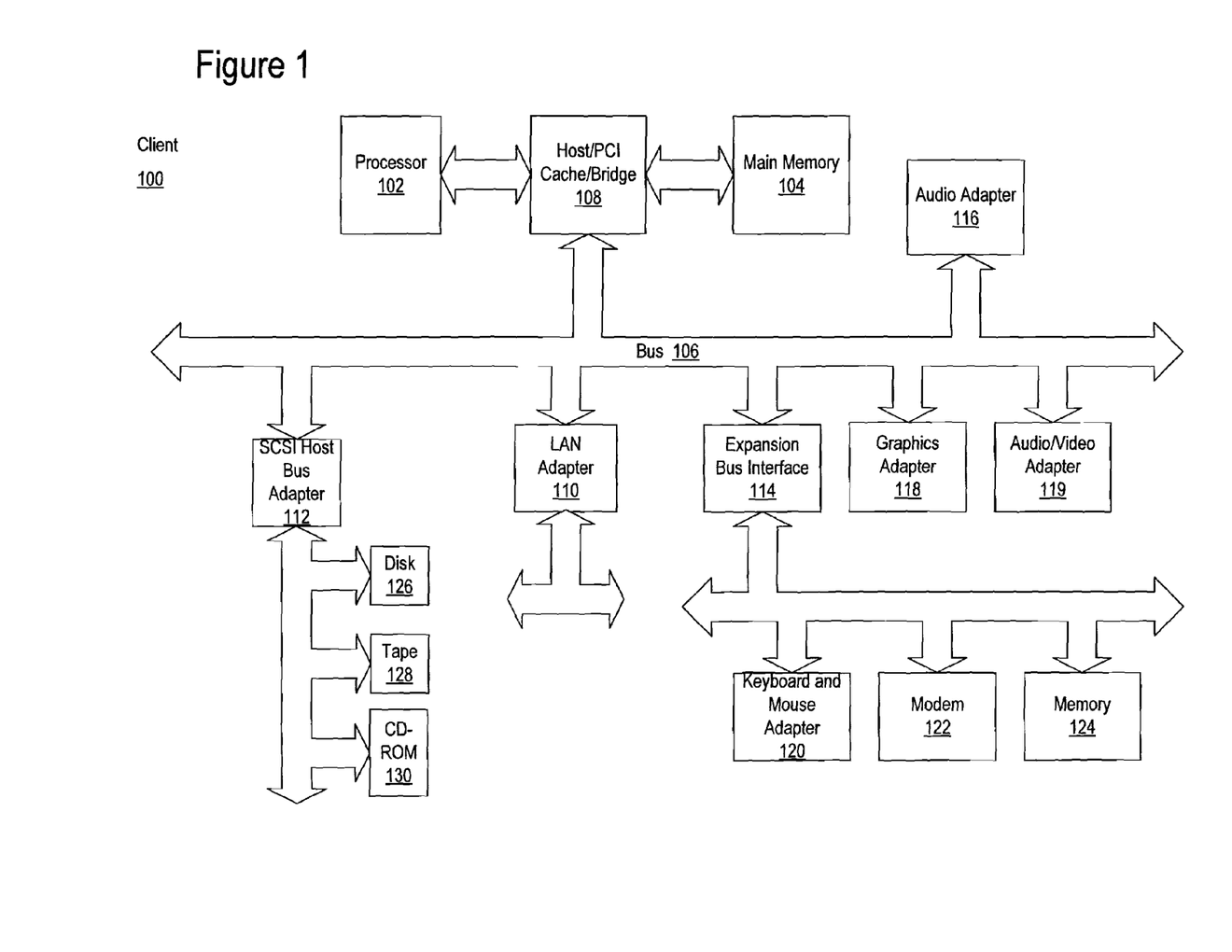
FIG. 1 is a block diagram illustrating a data processing system in which the present invention may be implemented.

With reference now to the figures, FIG. 1, is a block diagram illustrating a data processing system in which the present invention may be implemented. Data processing system 100 is an example of a client computer. Data processing system 100 employs a peripheral component interconnect (PCI) local bus architecture. Although the depicted example employs a PCI bus, other bus architectures, such as Micro Channel and ISA, may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD- ROM drive 130. Typical PCI local bus implementations support three or four PCI expansion slots or add-in connectors.

An operating system runs on processor 102 and is used to coordinate and provide control of various components within data processing system 100 in FIG. 1. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide nonvolatile memory for storing operating system files and/or user-generated data.

Neither the depicted example in FIG. 1 nor the above-described examples are meant to imply architectural limitations.

As mentioned above, identifying teaser surfers (customers who transfer their balances from one card to another to take advantages of low introductory interest rates) and point churners (customers who transfer their balance from card to card to accumulate reward points) is important for financial institutions that intend to remain solvent. Introductory rates and reward points might be thought of as a loss leader for the credit card issuer. Profitability of the credit card issuer necessitates that the customer maintain a balance on the card for a sufficient period of time after the teaser rate expires. Only by the customer maintaining a balance on the card can the card issuer recoup the cost off the introductory rate and/or reward points. Typically, teaser surfers and point churners do not maintain a balance on credit card accounts long enough for the credit card issuer to recoup losses incurred from the low teaser rates.

Figure 2:
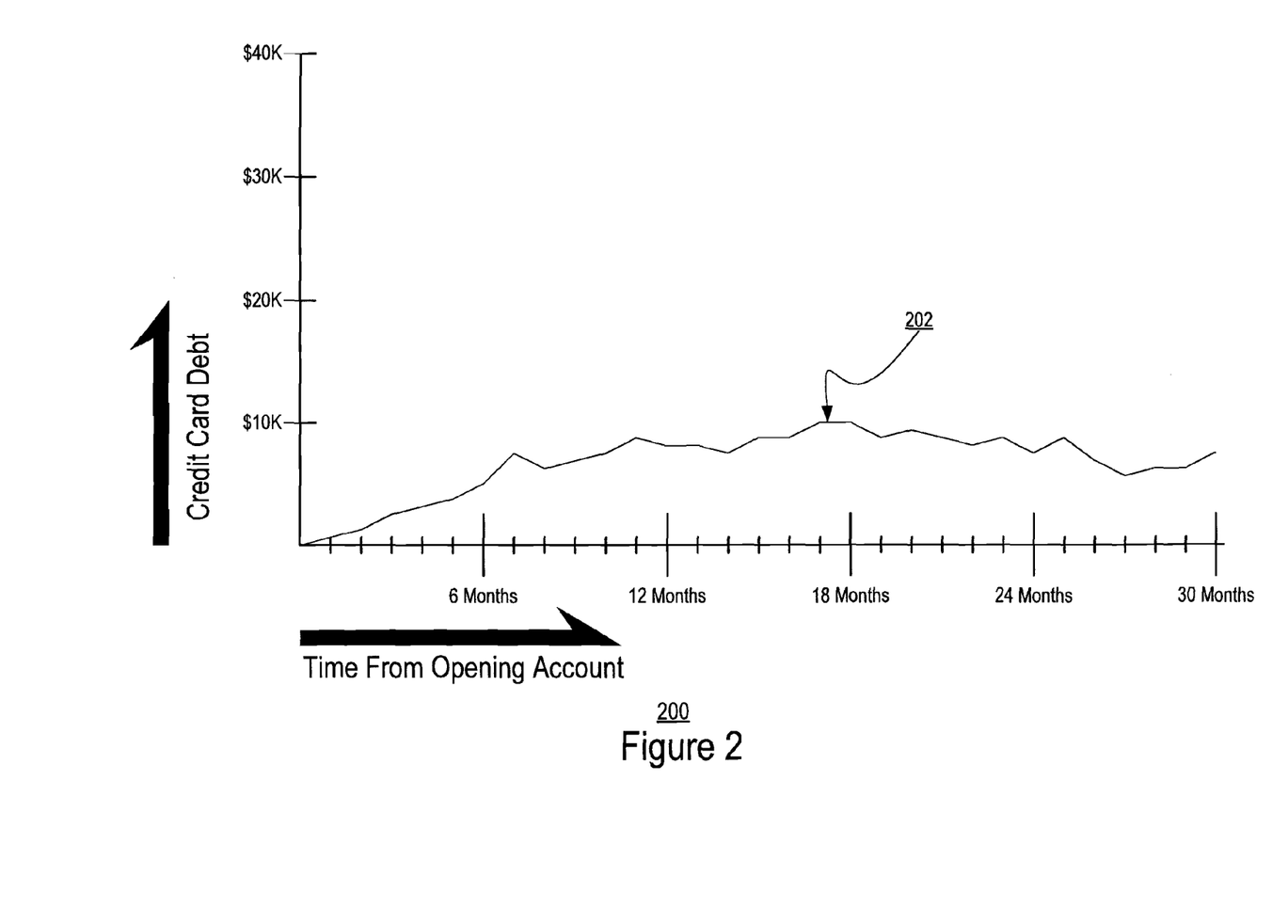
FIG. 2 is a chart depicting a typical debt profile of traditional credit card account.

FIG. 2 is a chart depicting a typical debt profile for a traditional credit card account. Chart 200 shows thirty consecutive months of customer credit card data for a single card. The card is issued at month zero and month thirty is the most recent data month. The vertical axis is graduated in dollars of credit card debt. Curve 202 depicts credit card debt over time. Note that in the traditional approach the credit card issuer reaps a profit from the customer from the time the first charge was made by the customer. Here credit card debt has gradually accrued until stabilizing sometime between the first and second year.

Figure 3:
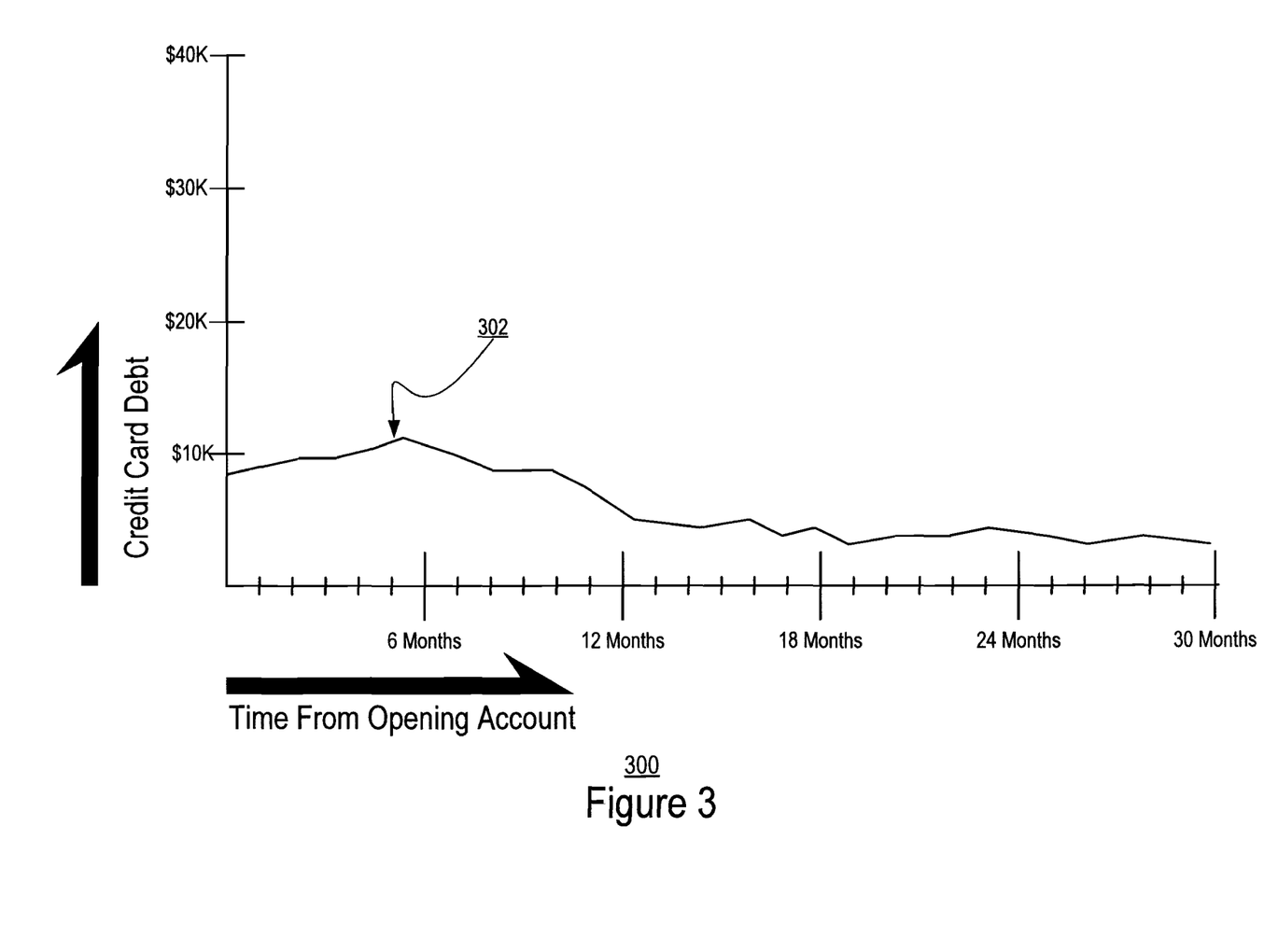
FIG. 3 is a chart depicting a debt profile of a non-traditional credit card account, wherein the customer has been lured by a low introductory interest rate and/or reward points.

FIG. 3 is a chart depicting a debt profile for a non-traditional credit card account, wherein the customer has been lured to open the account by a low introductory interest rate and/or reward points. Chart 300 also shows thirty months of customer data with the card being issued at month zero. Curve 302 depicts credit card debt over time. At first blush it appears that the credit card issuer has significantly increased the profit over the customer account depicted in FIG. 2 because the customer's initial debt is much higher than that shown on curve 202 in FIG. 2. Here, credit card debt does not gradually increase. However, in the depicted example the customer has taken advantage of a teaser rate, so rather than profiting from the customer's credit card debt, the credit card issuer actually losses money on the customer during the period of the low introductory interest rate. The loss is considered an investment on the new customer by the credit card issuer. In order for the credit card issuer to receive a return on that investment, the customer must maintain a balance on the account for a sufficient period of time. Curve 302 illustrates that in this particular example, the customer has continued to maintain a balance after the teaser rate expired. Therefore, at some point in time the customer's account has become profitable for the credit card issuer.

Figure 4:
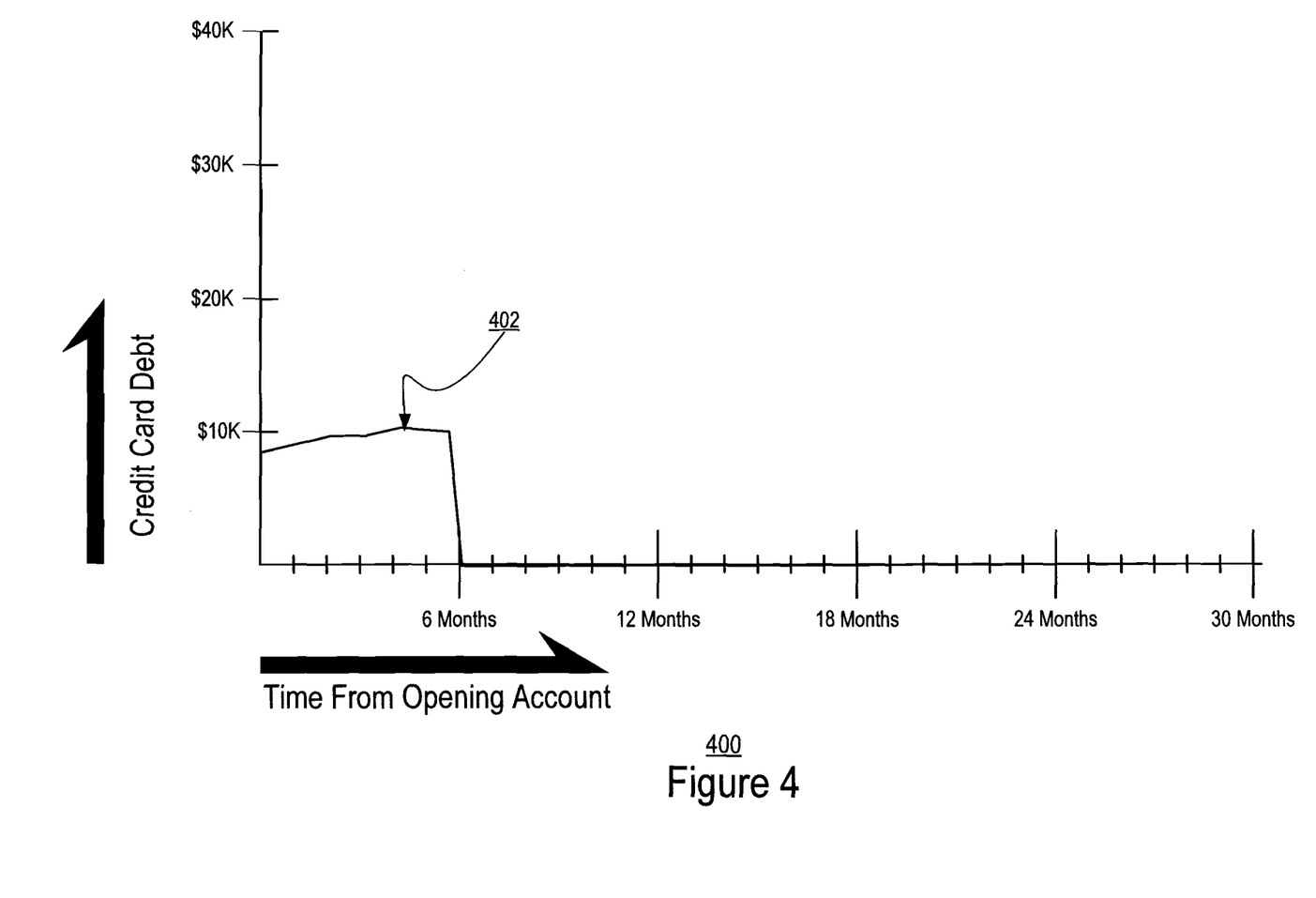
FIG. 4 is a chart depicting a debt profile of a non-traditional credit card account, wherein an apparent teaser surfer customer has been lured by a teaser rate and/or reward points.

FIG. 4 is a chart depicting a debt profile for a non-traditional credit card account, wherein a teaser surfer has been lured by a low teaser rate and/or reward points. Curve 402 depicts credit card debt over time. Note that unlike the debt profiles depicted in either FIG. 2 or FIG. 3, the customer has not maintained a balance on the credit card. Here the teaser surfer has transferred significant debt to the credit card in order to take advantage of the teaser rate. Once the teaser rate expired the customer surfed to another low teaser rate credit card to avoid paying higher interest rates. Note the sharp drop in credit card balance after the sixth month.

In an effort to reduce the exposure to teaser surfers, a credit manager for a credit card issuer might simply examine each applicant's credit history for a debt profile similar to that illustrated by curve 402. The problem with that approach is that the customer may have other reasons for discontinuing the credit card account. Many times a customer is disappointed with the service or lack of convenience offered by a particular financial institution. The customer may have originally intended to maintain a relationship with credit card issuer but been disappointed with some aspect of the relation. In that case the customer might be wrongly labeled as a teaser surfer. Denying a credit card to such a customer might cause the credit card company to lose a valuable long-term customer. So by merely identifying a credit card debt profile from a single credit card as that of a teaser surfer does not necessarily infer that the customer is actually a teaser surfer. More credit information is needed for the credit card issuer to accurately make such a determination.

Figure 5:
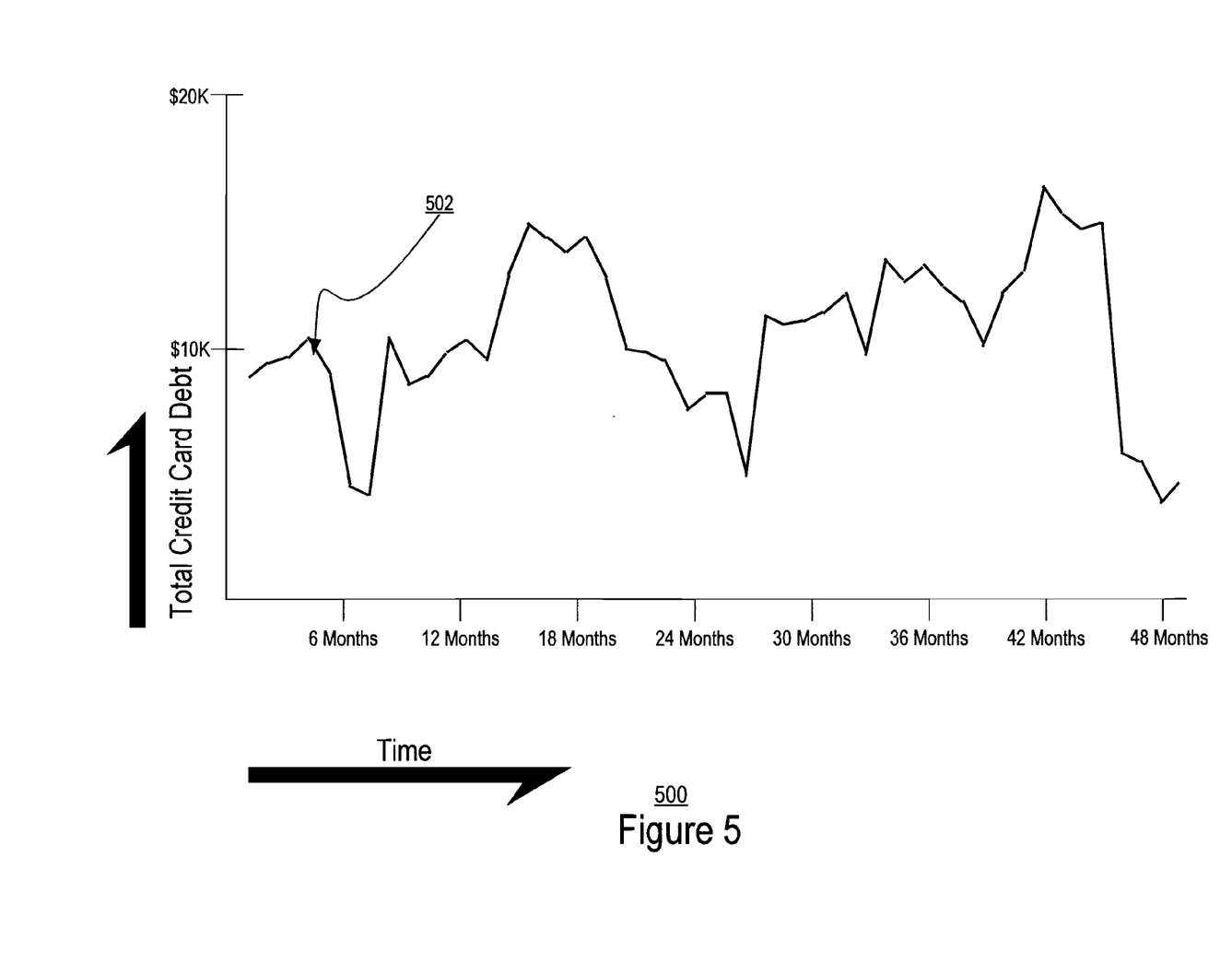
FIG. 5 is a chart depicting a debt profile taken from the total credit card debt of a customer.

FIG. 5 is a chart depicting a total credit card debt profile of a customer. Chart 500 shows forty-nine months of a customer's total credit card data. Curve 502 depicts the total credit card debt over time. Total credit card debt is influenced by the interplay between a myriad of opposing economic and personal factors. Some factors are fairly regular or cyclic such as increases in total credit card debt in anticipation of the holidays and debt contraction due to tax refunds and quarterly/yearly bonuses. Others are less rhythmical such as business expenses, emergencies and the receipt of one-time cash gifts. Curve 502 reflects some of those influences. A credit manager may attempt to spot individual teaser surfer debt profiles within the total credit card debt profile of a potential customer, however such a strategy is dangerous given the unpredictability of credit card debt. More importantly, attempting to spot a teaser surfer's debt profile from a customer's total debt profile is more likely to result in the rejection of a potentially profitable customer.

FIGS. 6 and 7 are tables representing credit card data used for generating the charts in FIG. 5 and FIGS. 8-10. FIG. 6 is a table containing a customer's credit card data that is readily available from a credit bureau. Table 600 represents forty-nine months of data for ten different credit card accounts maintained during at least some portion of the forty-nine month period and the total credit card debt for each month. The oldest reported month is month one and the reporting month or current month is month forty-nine. The credit cards are listed as credit cards 802 through 820. Without more than a quick glance at table 600, it is apparent that a customer with credit cards 802-814 were teaser surfed. A customer with credit cards 816-820, on the other hand, show a fairly constant balance during the reporting period and indicate more typical debt profiles of traditional credit card accounts. However, a credit manager might conclude that the customer with cards 802-820 is teaser surfer. The rationale is that table 600 shows a large number of apparent teaser surfer debt profiles versus the relatively small number of typical debt profiles from traditional credit card accounts.

FIG. 7 is a table containing data computed using the present process in accordance with a preferred embodiment of the present invention. Table 700 represents forty-nine months of computed data for the ten different credit card accounts shown in table 600 depicted in FIG. 7. Each column represents a separate permutation commencing with total debt for new cards, which were opened for six or fewer months (6 mo). The next column lists debt for relatively new cards, which were opened twelve months or less (12 mo). The fourth column lists the percentage of debt maintained in new accounts versus the total credit card debt for a particular month (%<6 mo Debt) followed by the percentage of debt maintained for relatively new accounts versus the total credit card debt (%<12 mo Debt %).

The present invention proposes two ways to identify teaser surfers. The first and simplest one is to use average balance percentages of new and relative new cards based on historical credit information. Credit cards are grouped into three different categories based on issuing dates. Specifically, new, relatively new, and old cards; those that are opened within six months, within twelve months, and twelve months, respectively. Whether a card is opened within 6 months depends on each specific examination time point, but not at present time. Two years of historical data is used for the computation because of the trade-off between more information and costs. Then, the balances for each of the three categories are calculated for each month. The next step is to calculate the average balance percentages of the credit cards opened within six months and twelve months over the proceeding twenty-four month period or 12-month period. The final step is to identify those customers who are teaser surfers with the following rules:

1. If the average percentages within the last twenty-four months for all cards opened within six and twelve months are greater than predefined percentages (for example, 65% for all cards opened within six months or 85% within twelve months) and the age of file for the same customer is older than a predefined months/years (three years for example), then a customer is labeled as a teaser surfer.
2. If neither condition for cards opened within six months nor for within twelve months is satisfied, then the customer is not a teaser surfer.

Figure 8:
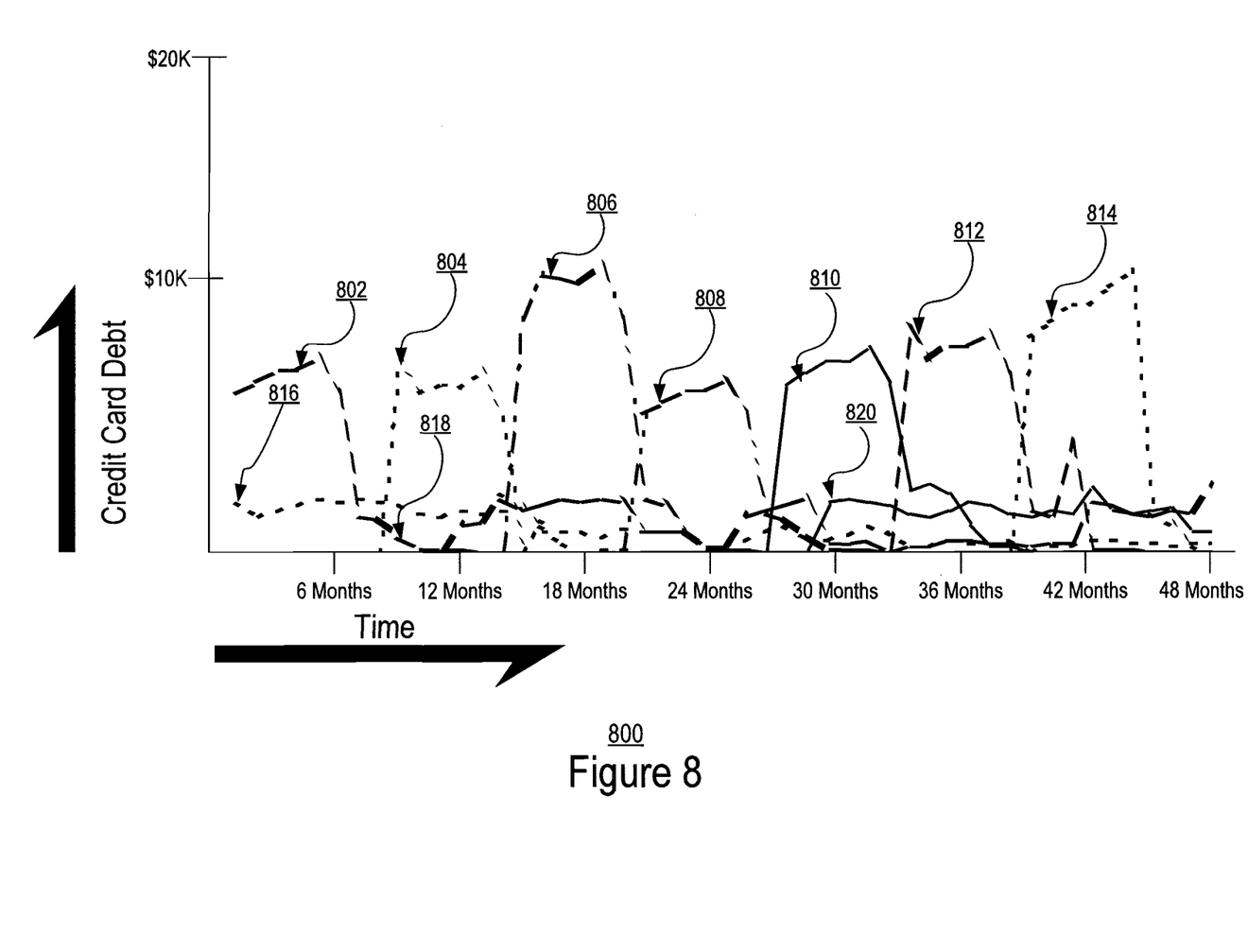
FIG. 8 is a chart depicting a debt profile taken from the total credit card debt of a customer broken down by individual credit card.

FIG. 8 is a chart depicting a debt profile taken from the total credit card debt of a customer broken down by individual credit cards. Chart 800 shows forty-nine months of a customer's total credit card data, with respect to each credit card maintained during that reporting period. The credit cards are listed as credit cards 802 through 820. Curves 802-820 are graphic representations of the data contained in columns 802-820 in table 600 in FIG. 6 for credit cards 802-820. Chart 800 confirms the data from table 600 that the customer is a teaser surfer. Note that each of curves 802-814 begins with an initially high balance, which then retreats over a six to twelve month time period. Note however, that curves 816-820 maintain a fairly constant balance which is representative of the more typical debt profile of traditional credit card accounts.

Figure 9:
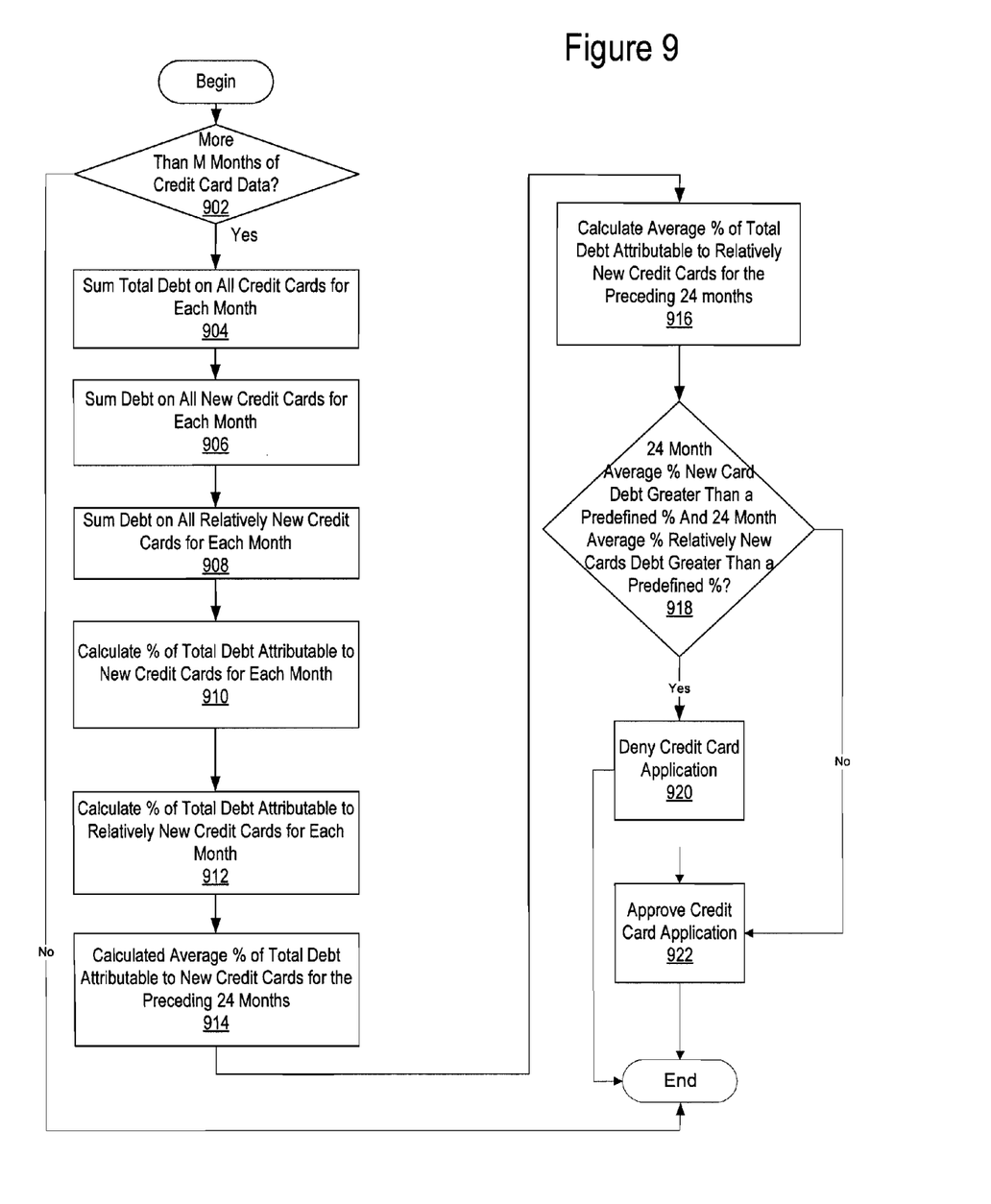
FIG. 9 is a flowchart depicting a process for rating potential credit card customers in accordance with a preferred embodiment of the present invention.

FIG. 9 is a flowchart depicting a process for rating potential credit card customers in accordance with a preferred embodiment of the present invention. The process begins by accessing a potential customer's credit history from a credit bureau/ bureaus to examine if M months of data are listed in the file (step 902). M may be any integer higher than the time periods used to define new and relatively new accounts used for the rating potential credit card customers, in a preferred embodiment the time periods are six and twelve months so the value of M must be greater than twelve months. A value of thirty-six months for M is preferred. Each month's total credit card balance is then summed for the time period listed on the credit history (step 904). The debt on newly opened credit cards is then summed (step 906) as is the debt on relatively newly opened credit cards (step 908). A newly opened credit card is a credit card that has been opened for six months or less and a relatively newly opened credit card is a credit card that has been opened for twelve or fewer months.

One of ordinary skill in the art would recognize that the time period for taking advantage of low teaser rates is established by credit card issuers and might fluctuate. Currently, many credit card issuers limit the time period for receiving low teaser rates to six months. Other issuers have extended the period to twelve months, especially for earning reward points. A "new" credit card or account may also be defined as one in which a low teaser interest rate is offered and a "relatively new" credit card is one that teaser rates may still be offered, although less likely. Therefore, the terms "new" and "relatively new" are actually defined by the likelihood of receiving teaser rates rather than a set chronological time period. The time period for new and relatively new credit cards is dependent upon the duration of teaser rates and rewards. Clearly, as the duration of teaser rates on newly issued credit cards fluctuates, the time period used for defining new and relatively new credit cards must be adjusted accordingly.

Returning to the FIG. 9, the percentage of total credit card debt that is attributable to new credit cards is calculated for each month (step 910) along with the percentage of total credit card debt that is attributable to relatively new credit cards (step 912). The average percentage of total credit card debt that is attributable to new credit cards is calculated for the previous twenty-four months (step 914). Likewise, the average percentage of total credit card debt that is attributable to relatively new credit cards is calculated for the previous twenty-four months (step 916). These percentages indicate the potential profitability of the customer with respect to teaser surfing. The lower the percentages, the less likely that the potential customer teasers surfs to excess. More important to the credit card issuer, the average percentage of debt attributable to an open credit card for fewer than six and twelve months indicates whether the customer is generating a profit, for at least some of the credit card issuers. This holds true even assuming that all credit cards offer a low introductory rate.

The trick is to determine the cut-off values for the percentages. The values of the predetermined percentages must be set low enough for potentially profitable customers to get a credit card yet high enough to screen out teaser surfers from getting a credit card. In accordance with a preferred embodiment of the present invention the predetermined percentage for the twenty-four month average of the percentage of relatively new credit card debt is 85%, while the predetermined percentage for the twenty-four month average of the percentage of relatively new credit card debt is 65%. The twenty-four month averages of the percentage of new and relatively new credit card debt is then compared to the predetermined percentages (step 918). Both predetermined percentage rates must not be exceeded prior to a potential customer being approved for a credit card (step 920). If both predetermined percentage rates are exceeded, the customer is denied a credit card (step 922). The process then ends.

Figure 10:
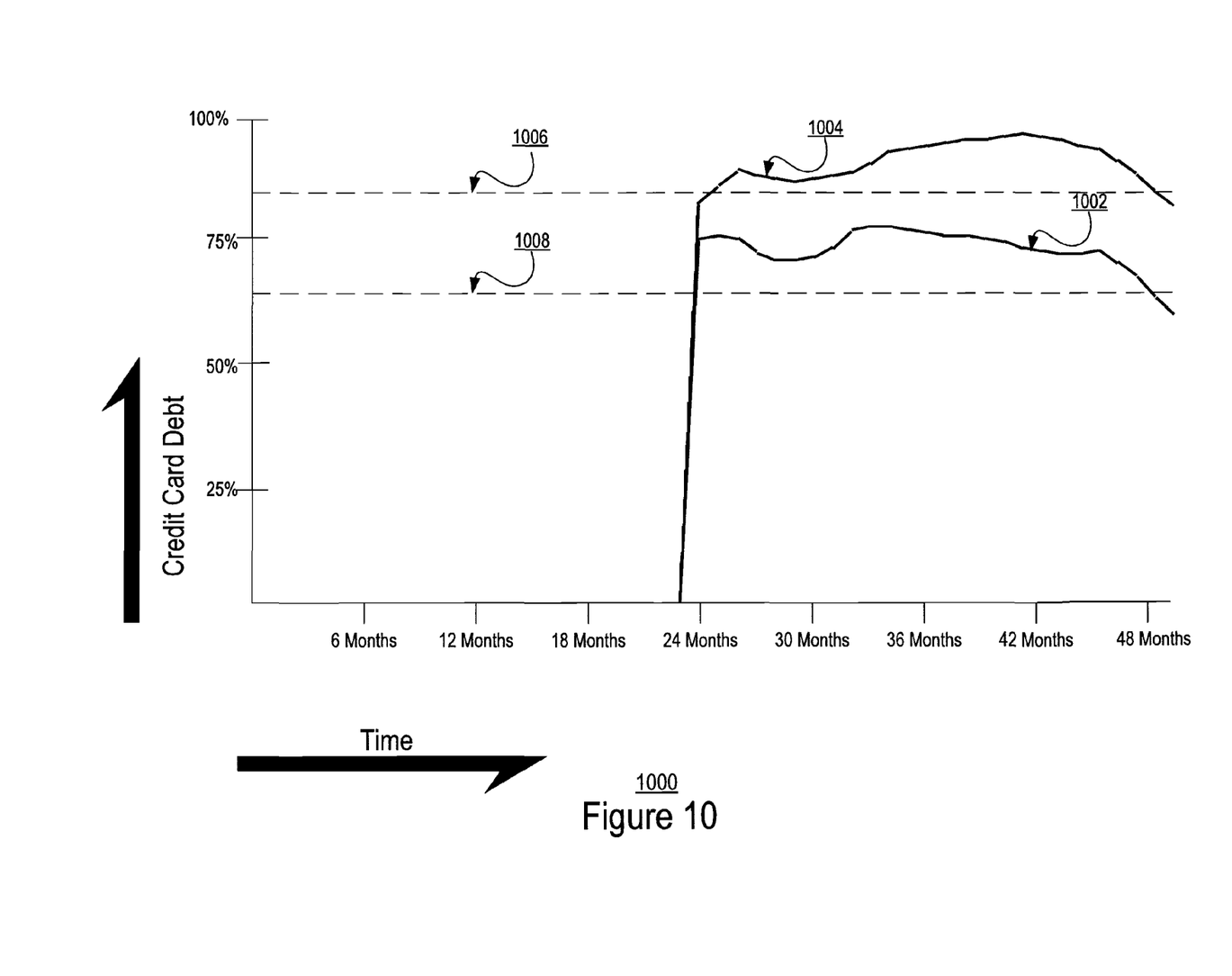
FIG. 10 is a chart depicting the outcome of the process discussed above for the customer credit history.

FIG. 10 is a chart depicting the outcome of the process discussed above for the customer credit history shown on table 600 in FIG. 6. Chart 1000 shows valid results for the most recent twenty-five of the forty-nine months of credit card history data. Curve 1002 represents a twenty-four month average of the percentage of new credit card debt and curve 1004 represents the twenty-four month average of the percentage of relatively new credit card debt. Curves 1002 and 1004 are merely exemplary for the purpose of describing the invention and would not normally be generated. Pragmatically, only a single value representing the twenty-four month average percentage of new credit card debt and the twenty-four month average percentage of relatively new credit card debt would be generated and then compared to a pair of predetermine percentages. Curves 1006 and 1008 represent the values for the predetermined percentages to be compared to curves 1002 and 1004, respectively. Curves 1002 and 1004 represent data from the "24 avg<6 mo Debt" (preceding twenty-four months average of new account debt versus total debt) and the "24 avg<12 mo Debt" column (preceding twenty-four months average of relatively new account debt versus) of table 700 illustrated in FIG. 7.

Note that at least one of curves 1002 and 1004 exceed their predetermined percentages of 65% and 85%, respectively, for nearly the entire time period for which the curves are valid. These results could be anticipated given a cursory examination of curves 802-816 shown on FIG. 8. However careful attention to curve 1002 reveals that the preceding twenty-four month average of new account debt versus total debt has been declining for the most recent five month period and has remained below the predetermine threshold percentage of 65% for the last two months. Furthermore, curve 1004 reveals that the preceding twenty-four months average of relatively new account debt versus total credit card debt is also below its predetermined threshold of 85% for the most recent two months. Therefore, the customer has been distinguished from a teaser surfer for each of the last two month and should be issued a credit card based on the present predetermined percentage criteria.

One advantage of this approach is that they can be used to identify teaser surfers quickly. The information can save a huge amount of money for credit card issuers on acquisition, operation, funding, and rewarding point costs that they may spend on those teaser surfers. In addition, both of them can be implemented easily with credit bureau information.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A non-transitory recordable-type medium containing a computer program product for identifying teaser surfers, the computer program product comprising:
    instructions for receiving, by the data processing system, a credit history data for a creditor;
    instructions for calculating, by the data processing system, a first set of sums, wherein each sum in the first set of sums comprises a total credit card debt for all credit cards issued to the creditor for a corresponding, different one month period, and wherein a first total number of sums in the first set of sums equals a predetermined number of months;
    instructions for calculating, by the data processing system, a second set of sums, wherein each sum in the second set of sums comprises a total new credit card debt for all new credit cards issued to the creditor for the corresponding, different one month period, and wherein a second total number of sums in the second set of sums equals the predetermined number of months;
    instructions for calculating, by the data processing system, a third set of percentages, wherein each percentages in the third set of percentages comprises a percentage of new credit card debt to total credit card debt for the corresponding, different one month period, and wherein a third total number of percentages in the third set of percentages equals the predetermined number of months;
    instructions for calculating, by the data processing system, an average percentage of new credit card debt to total credit card debt over the predetermined number of months;
    instructions for comparing, by the data processing system, the average percentage of new credit card debt to total credit card debt to a preset cutoff average percentage, wherein, by comparing, a comparison is formed; and
    instructions for determining, by the data processing system, whether to issue a credit card to the creditor based on the comparison.

2. The non-transitory recordable-type medium of claim 1 wherein the computer program product further comprises:
    instructions for calculating, by the data processing system, a fourth set of sums, wherein each sum in the fourth set of sums comprises a total credit card debt for all relatively new credit cards issued to the creditor for the corresponding, different one month period, and wherein a fourth total number of sums in the fourth set of sums equals the predetermined number of months;

instructions for calculating, by the data processing system, a fifth set of percentages, wherein each percentage in the fifth set of percentages comprises a percentage of relatively new credit card debt to total credit card debt for the corresponding, different one month period, and wherein a fifth total number of percentages in the fifth set of percentages equals the predetermined number of months;

instructions for calculating, by the data processing system, an average percentage of relatively new credit card debt to total credit card debt over the predetermined number of months;

instructions for comparing, by the data processing system, the average percentage of relatively new credit card debt to total credit card debt to a second preset cutoff average percentage, wherein, by comparing the average percentage of relatively new credit card debt to total credit card debt to the second preset cutoff average percentage, a second comparison is formed; and instructions for determining, by the data processing system, whether to issue a credit card to the creditor based on the second comparison.

3. The non-transitory recordable-type medium of claim 1 wherein the new credit cards have been issued to the creditor for less than six months.

4. The non-transitory recordable-type medium of claim 1 wherein the new credit cards are credit cards having been issued to the creditor for a period of time less than a preset time period, and wherein during the preset time period the new credit cards have low interest teaser interest rates.

5. The non-transitory recordable-type medium of 2 wherein the relatively new credit cards are credit cards having been issued to the creditor for less than twelve months.

6. The non-transitory recordable-type medium of claim 2 wherein the relatively new credit cards have been issued to the creditor for a period of time less than two preset time periods, and wherein the two preset time periods correspond to time periods during which the relatively new credit cards have low interest teaser interest rates.

7. The non-transitory recordable-type medium of claim 1 wherein the predetermined number of months is twelve months.

8. The non-transitory recordable-type medium of claim 1 wherein the predetermined number of months is twenty-four months.

9. The non-transitory recordable-type medium of claim 1 wherein the preset cutoff average percentage is sixty-five percent.

10. The non-transitory recordable-type medium of claim 2 wherein the second preset cutoff average is eighty-five percent.

11. A data processing system comprising:
a bus;
at least one processor coupled to the bus;
a computer usable medium coupled to the bus, wherein the computer usable medium contains a set of instructions for identifying teaser surfers, wherein the at least one processor is adapted to carry out the set of instructions to:
receive a credit history data for a creditor;
calculate a first set of sums, wherein each sum in the first set of sums comprises a total credit card debt for all credit cards issued to the creditor for a corresponding, different one month period, and wherein a first total number of sums in the first set of sums equals a predetermined number of months;
calculate a second set of sums, wherein each sum in the second set of sums comprises a total new credit card debt for all new credit cards issued to the creditor for the corresponding, different one month period, and wherein a second total number of sums in the second set of sums equals the predetermined number of months;
calculate a third set of percentages, wherein each percentages in the third set of percentages comprises a percentage of new credit card debt to total credit card debt for the corresponding, different one month period, and wherein a third total number of percentages in the third set of percentages equals the predetermined number of months;
calculate an average percentage of new credit card debt to total credit card debt over the predetermined number of months;
compare the average percentage of new credit card debt to total credit card debt to a preset cutoff average percentage, wherein, by comparing, a comparison is formed; and
determine whether to issue a credit card to the creditor based on the comparison.

12. The data processing system of claim 11 wherein the at least one processor is further adapted to carry out the set of instructions to:
calculate a fourth set of sums, wherein each sum in the fourth set of sums comprises a total credit card debt for all relatively new credit cards issued to the creditor for the corresponding, different one month period, and wherein a fourth total number of sums in the fourth set of sums equals the predetermined number of months;
calculate a fifth set of percentages, wherein each percentage in the fifth set of percentages comprises a percentage of relatively new credit card debt to total credit card debt for the corresponding, different one month period, and wherein a fifth total number of percentages in the fifth set of percentages equals the predetermined number of months;
calculate an average percentage of relatively new credit card debt to total credit card debt over the predetermined number of months;
compare the average percentage of relatively new credit card debt to total credit card debt to a second preset cutoff average percentage, wherein, by comparing the average percentage of relatively new credit card debt to total credit card debt to the second preset cutoff average percentage, a second comparison is formed; and
determine whether to issue a credit card to the creditor based on the second comparison.

13. The data processing system of claim 11 wherein the new credit cards have been issued to the creditor for less than six months.

14. The data processing system of claim 11 wherein the new credit cards are credit cards having been issued to the creditor for a period of time less than a preset time period, and wherein during the preset time period the new credit cards have low interest teaser interest rates.

15. The data processing system of claim 12 wherein the relatively new credit cards are credit cards having been issued to the creditor for less than twelve months.

16. The data processing system of claim 12 wherein the relatively new credit cards have been issued to the creditor for a period of time less than two preset time periods, and wherein the two preset time periods correspond to time periods during which the relatively new credit cards have low interest teaser interest rates.

17. The data processing system of claim 11 wherein the predetermined number of months is twelve months.

18. The data processing system of claim 11 wherein the predetermined number of months is twenty-four months.

19. The data processing system of claim 11 wherein the preset cutoff average percentage is sixty-five percent.

20. The data processing system of claim 12 wherein the second preset cutoff average is eighty-five percent.

\* \* \* \* \*